(12) United States Patent
Zhang et al.

(10) Patent No.: US 9,796,137 B2
(45) Date of Patent: Oct. 24, 2017

(54) ADDITIVE MANUFACTURING METHODS

(71) Applicant: The Boeing Company, Chicago, IL (US)

(72) Inventors: Hao Zhang, Camas, WA (US); Ryan P. Quarberg, Portland, OR (US)

(73) Assignee: THE BOEING COMPANY, Chicago, IL (US)

( * ) Notice: Subject to any disclaimer, the term of this patent is extended or adjusted under 35 U.S.C. 154(b) by 126 days.

(21) Appl. No.: 14/733,582

(22) Filed: Jun. 8, 2015

(65) Prior Publication Data
US 2016/0354976 A1    Dec. 8, 2016

(51) Int. Cl.
*B29C 67/00* (2017.01)
*B22F 3/10* (2006.01)
(Continued)

(52) U.S. Cl.
CPC ........ *B29C 67/0051* (2013.01); *B22F 3/1007* (2013.01); *B22F 3/1055* (2013.01);
(Continued)

(58) Field of Classification Search
CPC ... B29C 67/0051; B22F 3/1007; B22F 3/1055
(Continued)

(56) References Cited

U.S. PATENT DOCUMENTS 2,905,547 A * 9/1959 Yoblin ................ C22B 34/1295
419/31
4,505,764 A   3/1985 Smickley et al.
(Continued)

FOREIGN PATENT DOCUMENTS

WO    2012148471    11/2012

OTHER PUBLICATIONS

Gu et al: "Balling phenomena during direct laser sintering of multi-component Cu-based metal powder", Journal of Alloys and Compounds, Elsevier Sequoia, Lausanne, CH, vol. 432, No. 1-2, Mar. 6, 2007 (Mar. 6, 2007), pp. 163-166.
(Continued)

*Primary Examiner* — Nahida Sultana
(74) *Attorney, Agent, or Firm* — Parsons Behle & Latimer

(57) ABSTRACT

An additive manufacturing method includes using hydrogenated titanium in forming an object by additive manufacturing, the object having a first microstructure. The method includes heat treating the hydrogenated titanium and, after completing a shape of the object, dehydrogenating the object. The dehydrogenated object has a second microstructure different from the first microstructure. Also, another additive manufacturing method includes forming an object containing Ti-6Al-4V, the object having a first microstructure containing columnar structures along a build direction of the additive manufacturing and the object exhibiting mechanical property anisotropy resulting from the columnar structures. After completing a shape of the object, the method includes hydrogenating the Ti-6Al-4V, heat treating the object containing the hydrogenated titanium, and dehydrogenating the heat treated object. The method reduces mechanical property anisotropy and the dehydrogenated object has a second microstructure different from the first microstructure.

20 Claims, 4 Drawing Sheets

(51) Int. Cl.
*B22F 3/105* (2006.01)
*C22C 1/04* (2006.01)
*B33Y 10/00* (2015.01)
*B33Y 70/00* (2015.01)

(52) U.S. Cl.
CPC ........ *C22C 1/0458* (2013.01); *B22F 2998/10* (2013.01); *B22F 2999/00* (2013.01); *B33Y 10/00* (2014.12); *B33Y 70/00* (2014.12); *Y02P 10/295* (2015.11)

(58) Field of Classification Search
USPC ........................................................ 264/603
See application file for complete search history.

(56) References Cited

U.S. PATENT DOCUMENTS

| | | | | |
|---|---|---|---|---|
| 6,168,644 | B1* | 1/2001 | Fukasawa | B22F 9/023 423/645 |
| 2005/0084701 | A1 | 4/2005 | Slattery | |
| 2009/0065169 | A1* | 3/2009 | Chi | B23K 9/0026 164/68.1 |
| 2009/0278086 | A1* | 11/2009 | Fruchart | B22F 9/04 252/182.33 |
| 2012/0058002 | A1* | 3/2012 | Ivasishin | B22F 1/0003 419/28 |
| 2013/0071284 | A1* | 3/2013 | Kano | C22C 14/00 419/30 |
| 2013/0315773 | A1* | 11/2013 | Moxson | C01B 6/02 419/28 |
| 2014/0255240 | A1* | 9/2014 | Fang | B22F 3/101 419/29 |
| 2014/0263246 | A1* | 9/2014 | Brice | C23C 28/30 219/137 R |

OTHER PUBLICATIONS

Wang Y et al: "Development of highly porous titanium scaffolds by selective laser melting", Materials Letters, North Holland Publishing Company. Amsterdam, NL, vol. 64, No. 6, Mar. 31, 2010 (Mar. 31, 2010), pp. 674-676.
European Patent Office; Extended European Search Report; EP Application No. 16172400.0-1373; dated Oct. 11, 2016.
W. R. Kerr: "The Effect of Hydrogen as a Temporary Alloying Element on the Microstructure and Tensile Properties of Ti-6Al-4V", Metallurgical Transactions A, vol. 16A, Jun. 1985, pp. 1077-1087.
F. H. Froes, O. N. Senkov and J. I. Qazi: Hydrogen as a Temporary Alloying Element in Titanium Alloys: Thermohydrogen processing, International Materials Reviews, vol. 49, No. 3-4, 2004, pp. 227-245.
O. N. Senkov, J. J. Jones and F. H. Froes: "Recent Advances in the Thermohydrogen Processing of Titanium Alloys", JOM, Jul. 1996.
Hao Zhang, et al. "The Effect of Hydrogen on Microstructure and Superplastic Deformation of Ti-6Al-4V", Rare Metal Materials and Engineering, vol. 20, No. 5, Oct. 1991, pp. 52-58.
W. E. Frazier, "Metal Additive Manufacturing: A Review" Journal of Materials Engineering and Performance, Published online: Apr. 8, 2014.

* cited by examiner

ADDITIVE MANUFACTURING METHODS

BACKGROUND

"Additive manufacturing" (AM), also known as 3D free form manufacturing, digital manufacturing, direct metal deposition, shaped metal deposition, etc., refers to a process of joining materials to make three-dimensional (3D) objects as opposed to subtractive manufacturing methodologies, such as machining. 3D printing represents one form of additive manufacturing. Additive manufacturing includes incremental additions of materials in designated locations, often one layer at a time. A "build direction" of the object refers to the direction in which the incremental materials are successively added or stacked. Known apparatuses for additive manufacturing include powder bed systems, powder feed systems, wire feed systems, etc., such as described in Frazier, William E. "Metal additive manufacturing: A review." Journal of Materials Engineering and Performance 23, no. 6 (2014): 1917-1928, incorporated herein by reference.

Additive manufacturing presents benefits over known processes intended to manufacture complex parts from costly materials, such as metal alloys. Additive manufacturing allows significant reduction in scrap produced using subtractive manufacturing. Instead of machining a part from a work piece of solid material, additive manufacturing uses the amount or nearly the amount of material needed to yield a net-shape or near net-shape part.

Even so, objects produced from additive manufacturing exhibit unique metallurgical and mechanical properties. Although dimensions of an additive manufactured part may be accurately and precisely produced within tolerances, the part may lack the mechanical properties desired given the incremental additions of material. As a result, further additive manufacturing techniques are desired that enhance metallurgical and/or mechanical properties.

SUMMARY

An additive manufacturing method includes using hydrogenated titanium in forming an object by additive manufacturing, the object having a first microstructure. The method includes heat treating the hydrogenated titanium and, after completing a shape of the object, dehydrogenating the object. The dehydrogenated object has a second microstructure different from the first microstructure.

Another additive manufacturing method includes using titanium, titanium hydride, aluminum, and vanadium additive manufacturing feedstock in forming an object by additive manufacturing, the object having a first microstructure. After completing a shape of the object, the method includes heat treating the object, cooling the heat treated object, and dehydrogenating the cooled object. The dehydrogenated object has a second microstructure exhibiting finer and more uniform structure compared to the first microstructure.

A further additive manufacturing method includes forming an object containing Ti-6Al-4V by additive manufacturing, the object having a first microstructure containing columnar structures along a build direction of the additive manufacturing and the object exhibiting mechanical property anisotropy resulting from the columnar structures. After completing a shape of the object, the method includes hydrogenating the Ti-6Al-4V using hydrogen-containing gas, heat treating the object containing the hydrogenated titanium, and dehydrogenating the heat treated object. The method reduces mechanical property anisotropy and the dehydrogenated object has a second microstructure different from the first microstructure.

The features, functions, and advantages that have been discussed can be achieved independently in various embodiments or may be combined in yet other embodiments further details of which can be seen with reference to the following description and drawings.

Figure 1A:
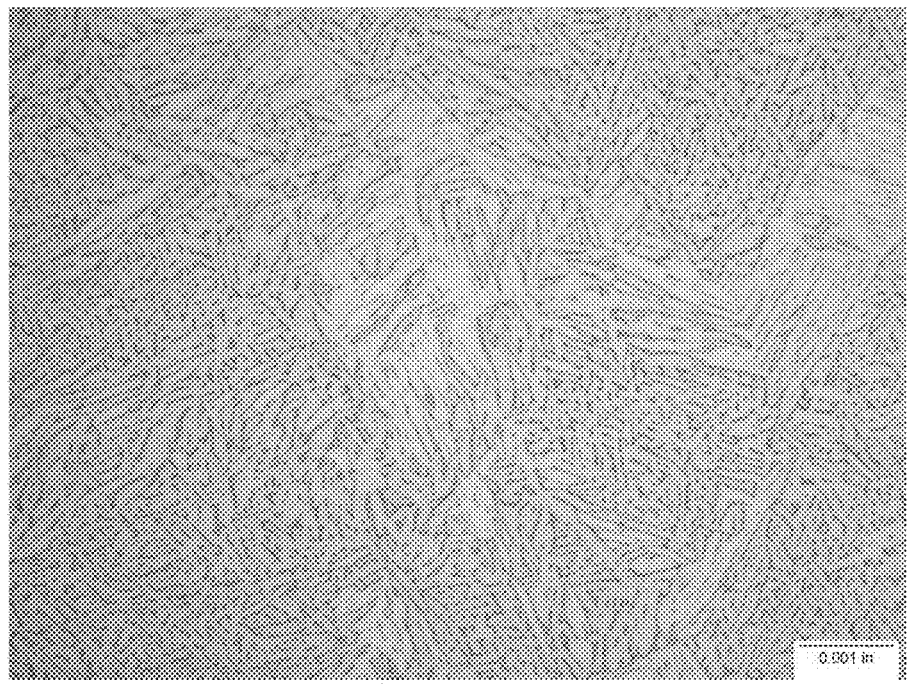
FIGS. 1A and 1B are photomicrographs of Ti-6Al-4V alloy in the x-direction before and after thermal hydrogen processing to 0.68 weight % hydrogen.
Figure 1B:
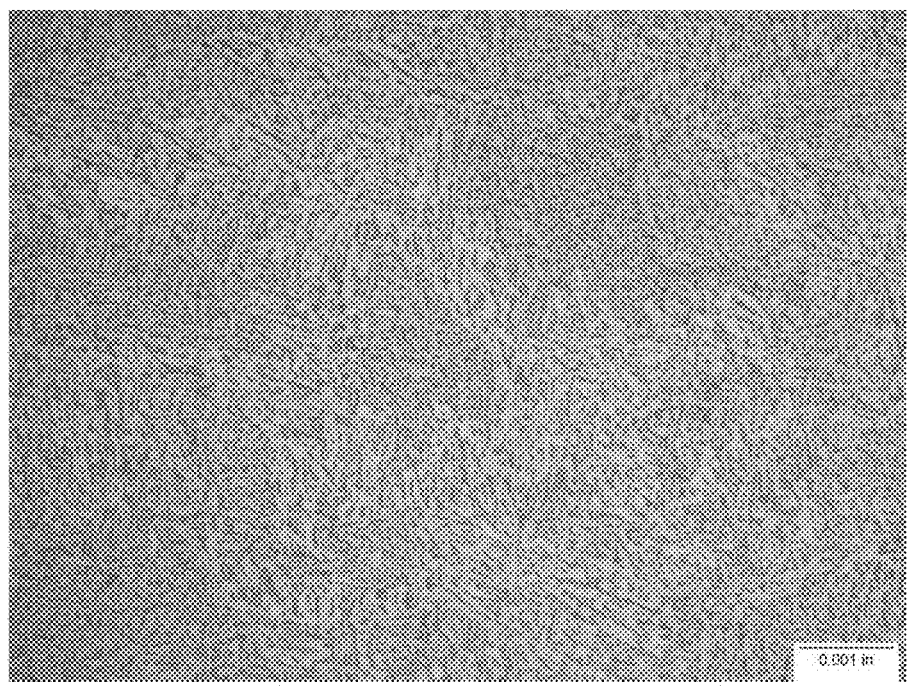
Figure 2A:
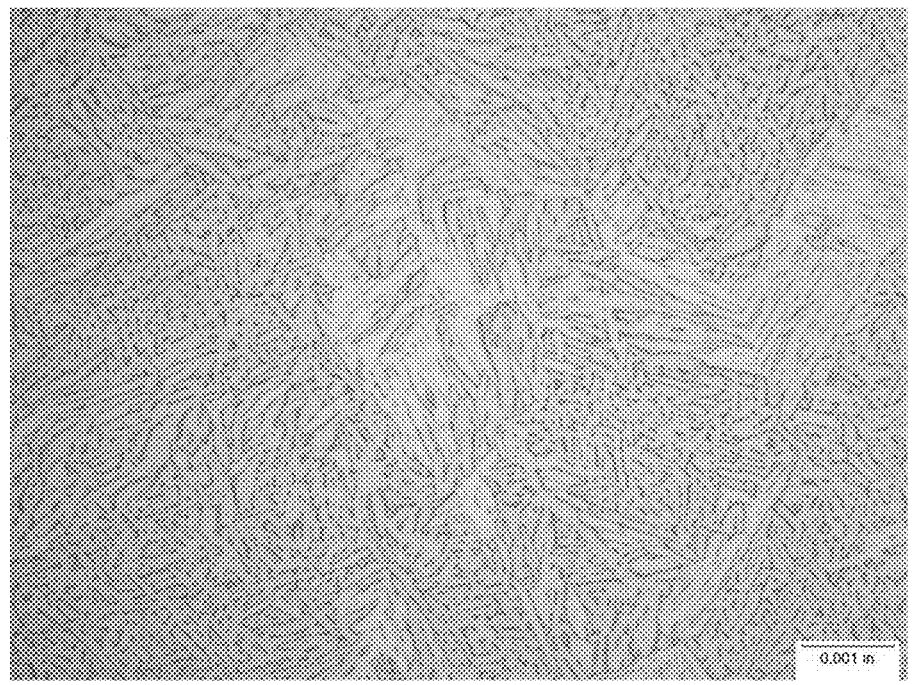
FIGS. 2A and 2B are photomicrographs of Ti-6Al-4V alloy in the x-direction before and after thermal hydrogen processing to 0.9 weight % hydrogen.
Figure 2B:
Figure 3A:
FIGS. 3A and 3B are photomicrographs of Ti-6Al-4V alloy in the z-direction before and after thermal hydrogen processing to 0.68 weight % hydrogen.
Figure 3B:
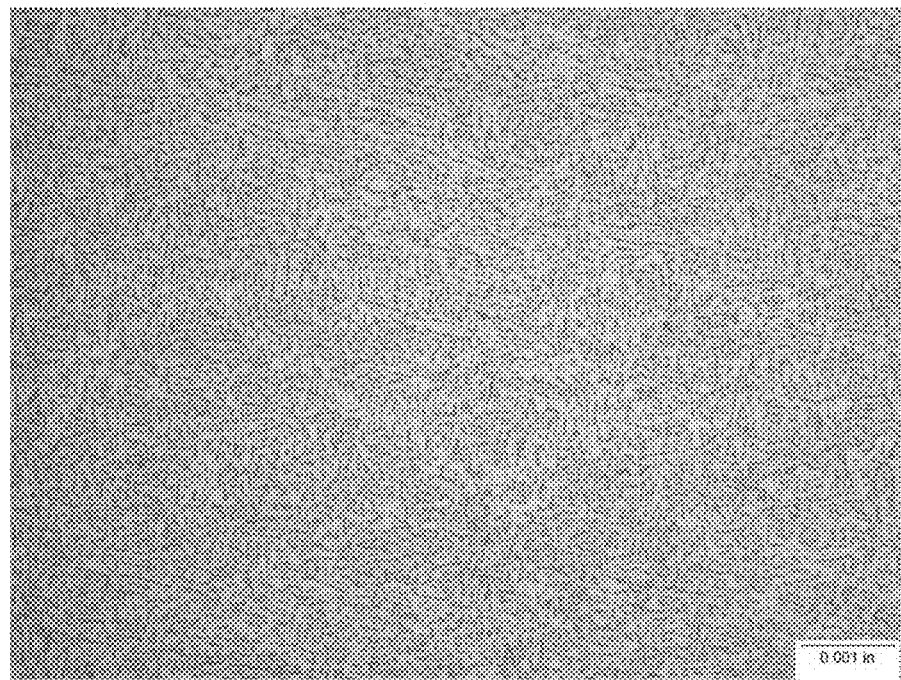
Figure 4A:
FIGS. 4A and 4B are photomicrographs of Ti-6Al-4V alloy in the z-direction before and after thermal hydrogen processing to 0.9 weight % hydrogen.
Figure 4B:
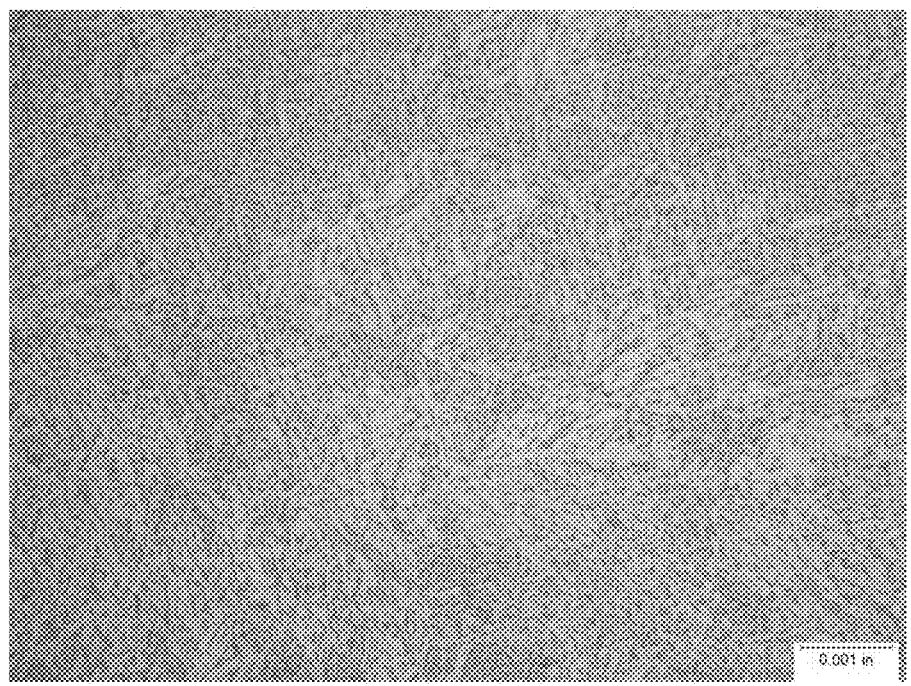

Some embodiments are described below with reference to the following accompanying drawings.

DETAILED DESCRIPTION

Additive manufacturing possesses huge potential in manufacturing of net and near-net shape metal components, such as airplane components. Additive manufacturing may even be used to repair or rebuild a portion of an existing component. However, observation indicates that metal alloys, including titanium alloys, made by additive manufacturing tend to yield large columnar structures along the build direction. The columnar structure contributes to mechanical property anisotropy and may yield lower fatigue strength. While a desired mechanical property may exist in one direction, a significantly different mechanical property may exist in another direction. A mechanical property may exist within tolerance in one direction, but not in the other direction. As a result, a part might not conform to the identified design specifications, thus lacking the mechanical property within tolerance.

Thermal-mechanical processing presents a possible methodology for refining the microstructure of components made by known processes. In known processes, thermal-mechanical processing of a work piece prior to machining may yield a part with greater mechanical property isotropy and increased fatigue strength. However, known thermal-mechanical processing techniques are not applicable to net and near-net shape additive manufactured components. The known techniques for mechanically working materials, such as forging, pressing, rolling, extruding, etc., to refine microstructure would destroy the additive manufactured component.

However, methods and apparatuses described herein involve refining microstructure and altering mechanical properties of additive manufactured components based on thermal-hydrogen processing (THP). Thermal-hydrogen processing uses hydrogen as a temporary alloying element to refine microstructure in a manner that may alter mechanical properties. Thermal-hydrogen processing applies a reversible hydrogenation-dehydrogenation method to achieve microstructure refinement. In summary, hydrogen diffuses throughout the metal during heat treatment and hydrogen removal during dehydrogenation invokes microstructural changes.

Titanium and its alloys are well-suited for thermal-hydrogen processing. Accordingly, one additive manufacturing method includes using hydrogenated titanium in forming an object by additive manufacturing, the object having a first microstructure. The method includes heat treating the hydrogenated titanium. After completing a shape of the object, the method includes dehydrogenating the object, the dehydrogenated object having a second microstructure different from the first microstructure.

By way of example, the use of hydrogenated titanium may include hydrogenating additive titanium using hydrogen-containing gas while adding titanium to the object. Notably, thermal-hydrogen processing involves diffusion. Consequently, the additive titanium used in building the object may be diffused with hydrogen to form hydrogenated titanium added during the build. The hydrogen-containing gas may include $H_2$ or a mixture of $H_2$ and inert gas, such as noble gas. "Hydrogenation" often refers to reacting hydrogen molecules ($H_2$) and another molecule or element. However, "hydrogenation" in the context of the present document is broadly defined as placing hydrogen in a material. Hydrogenation herein might include reacting hydrogen molecules, such as to form $TiH_2$, but also includes diffusing or other methods, for example, to produce a material alloyed with hydrogen, regardless of the specific hydrogen species used.

The use of hydrogenated titanium may alternatively include using additive manufacturing titanium feed stock containing hydrogen, such as in the form of titanium hydrides. That is, feed stock provided for use in the additive manufacturing method may already be hydrogenated. One example includes titanium hydride powder, such as $TiH_2$. A ratio of titanium powder to titanium hydride powder may be used to yield a desired content of hydrogen in an additive manufactured part, such as about 0.5 to about 1.2 weight % hydrogen. Since titanium hydride powder may be obtained for less cost compared to titanium powder, use of titanium hydride presents a way to reduce cost in addition to hydrogenating an additive manufactured part.

Other titanium feed stocks may be produced containing hydrogen, depending on the type of feed stock desired for an additive manufacturing process. For example, titanium wire containing diffused hydrogen or titanium alloy wire containing diffused hydrogen may be used. Beneficial titanium alloys include those containing aluminum and vanadium, such as Ti-6Al-4V.

When hydrogenating involves diffusing hydrogen from hydrogen-containing gas into a material, controlling the temperature under which hydrogenation occurs may be one factor in controlling hydrogen content of the processed material. Accordingly, hydrogenation may occur between about 500 and about 1,200° C., such as between about 600 and about 1,000° C. The hydrogen content of the gas used for diffusing hydrogen into the material may be another factor. Accordingly, hydrogen content in the gas may be about 1 to about 100 vol % (volume percent), such as about 5 to about 95 vol %, including about 20 to about 95 vol %.

Separately from the heat applied during hydrogenation, the method may include further heat treatment. Some configurations might not use further heat treatment when the heat applied during hydrogenation suffices as heat treatment to accomplish the purposes thereof described herein.

A variety of options exist for heat treatment, depending on the selection of feed stock and the type of additive manufacturing. The heat treating may occur between about 500 and about 1,200° C., such as between about 600 and about 1,000° C. The temperature may largely be determined by the metallurgical composition and the desired microstructure. Those of ordinary skill will appreciate that reference to known phase diagrams corresponding to a composition and showing phase transition temperatures will be instructive. Examples are shown in Froes, F. H., O. N. Senkov, and J. I. Qazi. "Hydrogen as a temporary alloying element in titanium alloys: thermohydrogen processing." International Materials Reviews 49, no. 3-4 (2004): 227-245, incorporated herein by reference.

With diffused hydrogen in the material, heat treating may take the material through a phase transformation from a first phase to a second phase stabilized by the presence of hydrogen. Crystal structure may change as a result of the phase transformation, for example, from hexagonal close packed to body centered cubic. The heat treating may occur after completing the shape of the object and before the dehydrogenating.

Additive manufacturing devices may be available or modifiable to accomplish heat treatment in the same chamber as additive manufacturing or the object may be removed and placed in another device for further processing, including heat treatment. Heat treating may instead occur while adding titanium to the object. Heat treating is intended to facilitate diffusion of hydrogen throughout the material so as to increase the alloying effect. Also, when a phase transus temperature is reached, phase changes occur, as described herein and in the cited references. Some additive manufacturing processes involve melting feed stock to add material. Melting may include exposure to electron beam, plasma, electric arc, laser energy, touch flame, etc. Heat treating may include melting additive manufacturing titanium feed stock while hydrogenating additive titanium using hydrogen-containing gas and while adding hydrogenated titanium to the object.

Thermal-hydrogen processing is known for microstructural refinement of cast titanium, such as described in U.S. Pat. No. 4,505,764 issued Mar. 19, 1985 to Smickley et al. and elsewhere. Consequently, in the event that hydrogenated feed stock, such as titanium wire or titanium alloy wire is used, known techniques for hydrogenating titanium materials may be used on the feed stock.

Hydrogen content of $H_2$ or other hydrogen-containing gaseous precursors may be varied to control hydrogen composition in hydrogenated materials formed during additive manufacturing. Argon, helium, krypton, or other noble or inert gases may be used in the hydrogen-containing gas. Controlling hydrogen and inert gas ratio, or partial pressures, of the respective gases may be effective in controlling hydrogen composition in hydrogenated materials.

It is expected that heat treating may occur during the build if feed stocks are used that do not contain hydrogen. In such manner, the heat treatment enhances diffusion into the feed stock during the build. Melting of feed stock during the build is expected to provide sufficient thermal energy to diffuse hydrogen into the added material during the build. Further heat treatment may be used to accomplish phase transformation after build completion.

Likewise, it is expected that feed stocks including hydrogen might not be heat treated until after build completion to avoid diffusing hydrogen out of the object during the build. Heat treatment after the build may still allow diffusion within the object. Even so, it is contemplated that heat treatment in a hydrogen-containing atmosphere may reduce diffusion of hydrogen out of hydrogen-containing feed stock allowing diffusion-promoting heat treatment during the build.

The method may further include cooling the object after the heat treating and after completing the shape of the object, but before the dehydrogenating. Cooling may stabilize the phase produced during heat treatment in preparation for dehydrogenation, which may refine microstructure. Cooling by quenching may be acceptable and includes known techniques for rapidly decreasing the temperature of the object. Furnace cooling may also be suitable and includes gradually lowering temperature, which may occur while keeping ambient hydrogen content constant compared to hydrogen content during the build. Other cooling techniques may be used, each of which may be selected largely dependent upon desired microstructural features.

Known techniques for thermal-hydrogen processing of wrought or cast titanium provide a starting point for appropriate heating and cooling regimes, including temperature, dwell times, etc. Thermal-hydrogen processing of additive manufactured parts bears beneficial results compared to cast parts, which must be removed from a mold prior to hydrogenation. In addition to mold removal, surface cleaning, whether by mechanical and/or chemical cleaning, is often required to remove an outer barrier layer on cast titanium alloys. Since such a barrier layer does not exist in additive manufactured parts, thermal-hydrogenation and dehydrogenation may proceed without cleaning.

The completed shape may include about 0.5 to about 1.2 weight hydrogen, such as about 0.6 to about 1 weight % hydrogen, before the dehydrogenating. The dehydrogenated object may contain titanium alloyed with aluminum and vanadium, such as Ti-6Al-4V. The titanium alloys may include alpha alloys, alpha+beta alloys, and beta alloys as defined by known phase diagrams, where alpha and beta designate different phases.

Alpha Ti alloys include, but are not limited to: Ti-5Al-2.5Sn and Ti-3Al-2.5V. Alpha+beta alloys include, but are not limited to: Ti-8Al-1V-1Mo, Ti-6Al-5Zr-0.5Mo-0.25Si, Ti-5.8Al-4Sn-3.5Zr-0.5Mo-0.7Nb-0.35Si-0.06C, Ti-6Al-2Sn-4Zr-2Mo-0.1Si, Ti-6Al-4V, Ti-6Al-4V ELI (extra-low interstitial), Ti-6Al-6V-2Sn, Ti-4Al-2Sn-4Mo-0.5Si, and Ti-5Al-4V-0.8Mo-0.5Fe. Beta alloys include, but are not limited to: Ti-6Al-2Sn-4Zr-6Mo, Ti-5Al-2Sn-2Zr-4Mo-4Cr, Ti-4.5Al-3V-2Mo-2Fe, Ti-5Al-2Sn-2Cr-4Mo-4Zr-1Fe, Ti-10V-2Fe-3Al, Ti-15Mo-2.7Nb-3Al-0.2Si, Ti-4.5Fe-6.8Mo-1.5Al, Ti-15V-3Cr-3Al-3Sn, and Ti-3Al-8V-6Cr-4Mo-4Zr.

The method may also be used to refine the microstructure of materials containing titanium intermetallic compounds, such as titanium aluminides, including gamma titanium aluminides and alpha titanium aluminides. The completed shape may be in the form of a bulk material, thick film, or thin film. The completed shape may form part of a titanium-based composite. The material in the completed shape may be porous. As such, hot isostatic pressing (HIP) may be used according to known techniques to reduce defects, such as porosity. HIP might occur before THP, as shown in the demonstration described below. However, HIP may instead occur after THP.

Desirably, the second microstructure may exhibit finer structure compared to the first microstructure. In the second microstructure, the alpha colonies and the acicular alpha phases in the alpha colonies and in prior-beta grain boundaries may be much finer than in the first microstructure. Prior-beta grains in the second microstructure may also be much finer than in the first microstructure. Also, the finer structure may be more uniform throughout the object. Accordingly, the method may include reducing mechanical property anisotropy. Repeating thermal-hydrogen processing is considered to further refine microstructure with each repetition.

Although a distribution of grain sizes may result from refinement, the dehydrogenated object may exhibit an alpha colony size, in the smallest dimension of the alpha colonies, of less than about 25 microns, including 5 to 25 microns, such as about 5 to 15 microns. The dehydrogenated object may exhibit an acicular alpha phase width, in the smallest dimension of the acicular alpha phase in alpha colonies and in grain boundaries, of less than about 10 microns, including 0.1 to 10 microns, such as about 0.1 to 0.3 microns. The dehydrogenated object may exhibit a prior-beta grain size, in the smallest dimension of the grains, less than about 100 microns, including 10 to 100 microns, such as about 10 to 40 microns.

Average grain size may be measured by known techniques, for example, ASTM Test Method E112. Such measurement may occur within selected boundaries of a portion of a surface area of the object. As an example, the measured area may include a statistically representative area that may be calculated by a known method. In addition to Test Method E112 referenced above, rules of thumb may be known for selecting a representative area.

Dehydrogenation may be conducted in a manner similar to vacuum annealing. Calculations based on diffusivity followed by chemical analysis may verify a desired level of hydrogen removal, such as less than 20 parts per million (ppm). By heating the hydrogenated, additive-manufactured part under vacuum to between 500 and 1,200° C., such as between about 600 and about 1,000° C., placement of hydrogen in the material may be reversed.

The features and benefits of the present method may also be used in combination with other methods and apparatuses discussed herein even though not specifically indicated otherwise.

Accordingly, another additive manufacturing method includes using titanium, titanium hydride, aluminum, and vanadium additive manufacturing feed stock in forming an object by additive manufacturing. The object has a first microstructure. After completing a shape of the object, the method includes heat treating the object and cooling the heat treated object. The cooled object is dehydrogenated, the dehydrogenated object having a second microstructure exhibiting finer structure compared to the first microstructure. Also, the finer structure may be more uniform throughout the object. Thus, the method may include reducing mechanical property anisotropy. The features and benefits of the present method may also be used in combination with other methods and apparatuses discussed herein even though not specifically indicated otherwise.

Also, a further additive manufacturing method involves thermal hydrogenation of an object after completing the object's shape. The method includes forming an object containing Ti-6Al-4V by additive manufacturing. The object has a first microstructure containing columnar structures along a build direction of the additive manufacturing. The object exhibits mechanical property anisotropy resulting from the columnar structures. After completing a shape of the object, the method includes hydrogenating the Ti-6Al-4V using hydrogen-containing gas. The object containing the hydrogenated titanium is heat treated. The method includes dehydrogenating the heat treated object and reducing mechanical property anisotropy, the dehydrogenated object having a second microstructure different from the first microstructure.

FIGS. 1A/B to 4A/B are photomicrographs of Ti-6Al-4V alloy in two directions showing microstructure before and after thermal hydrogen processing. Each set of Figures shows refinement of microstructure whether at 0.68 or 0.9 weight % hydrogen content in the hydrogenated alloy. Each sample was processed according to the present method. Ti-6Al-4V powder was used in an electron beam melt, powder bed, additive manufacturing process to form the test objects. After hot isostatic pressing the completed objects, THP was used to refine microstructure. The features and benefits of the present method may also be used in combination with other methods and apparatuses discussed herein even though not specifically indicated otherwise.

In compliance with the statute, the embodiments have been described in language more or less specific as to structural and methodical features. It is to be understood, however, that the embodiments are not limited to the specific features shown and described. The embodiments are, therefore, claimed in any of their forms or modifications within the proper scope of the appended claims appropriately interpreted in accordance with the doctrine of equivalents.

What is claimed is:

1. An additive manufacturing method comprising:
   using hydrogenated titanium in forming an object by additive manufacturing, the object having a first microstructure;
   heat treating the hydrogenated titanium between about 600 and about 1,000° C.; and
   after completing a shape of the object, dehydrogenating the object under vacuum between about 500 and about 1,200° C., the completed shape containing about 0.5 to about 1.2 weight % hydrogen before the dehydrogenating and the dehydrogenated object having a second microstructure exhibiting finer structure compared to the first microstructure such that the dehydrogenated object exhibits a size of alpha colonies, in the smallest dimension of the alpha colonies, of less than about 25 microns and an acicular alpha phase width, in the smallest dimension of the acicular alpha phase in the alpha colonies and in grain boundaries, of less than about 10 microns.

2. The method of claim 1 wherein the use of hydrogenated titanium comprises hydrogenating additive titanium using hydrogen-containing gas while adding titanium to the object.

3. The method of claim 2 wherein the hydrogen-containing gas comprises $H_2$.

4. The method of claim 1 wherein the use of hydrogenated titanium comprises using additive manufacturing titanium feedstock containing hydrogen.

5. The method of claim 4 wherein the feedstock comprises titanium hydride powder.

6. The method of claim 4 wherein the feedstock comprises titanium wire containing diffused hydrogen or titanium alloy wire containing diffused hydrogen.

7. The method of claim 1 wherein the dehydrogenating occurs between about 600 and about 1,000° C.

8. The method of claim 1 wherein the heat treating occurs while adding titanium to the object.

9. The method of claim 8 wherein the heat treating comprises melting additive manufacturing titanium feedstock while hydrogenating additive titanium using hydrogen-containing gas and while adding hydrogenated titanium to the object.

10. The method of claim 1 wherein the heat treating occurs after completing the shape of the object and before the dehydrogenating.

11. The method of claim 1 further comprising cooling the object after the heat treating and after completing the shape of the object, but before the dehydrogenating.

12. The method of claim 1 wherein the completed shape comprises about 0.6 to about 1 weight % hydrogen before the dehydrogenating.

13. The method of claim 1 wherein the dehydrogenated object comprises titanium alloyed with aluminum and vanadium.

14. The method of claim 1 wherein the size of alpha colonies is 5 to 25 microns and the acicular alpha phase width is 0.1 to 10 microns.

15. An additive manufacturing method comprising:
    using titanium, titanium hydride, aluminum, and vanadium additive manufacturing feedstock in forming an object by additive manufacturing, the object having a first microstructure;
    after completing a shape of the object, heat treating the object between about 600 and about 1,000° C.;
    cooling the heat treated object; and
    dehydrogenating the cooled object under vacuum between about 500 and about 1,200° C., the completed shape containing about 0.5 to about 1.2 weight % hydrogen before the dehydrogenating and the dehydrogenated object having a second microstructure exhibiting finer and more uniform structure compared to the first microstructure such that the dehydrogenated object exhibits a size of alpha colonies, in the smallest dimension of the alpha colonies, of less than about 25 microns and an acicular alpha phase width, in the smallest dimension of the acicular alpha phase in the alpha colonies and in grain boundaries, of less than about 10 microns.

16. The method of claim 15 wherein the dehydrogenating occurs between about 600 and about 1,000° C.

17. The method of claim 15 wherein the completed shape comprises about 0.6 to about 1 weight % hydrogen before the dehydrogenating.

18. The method of claim 15 wherein the dehydrogenated object comprises titanium alloyed with aluminum and vanadium.

19. The method of claim 18 wherein the titanium alloyed with aluminum and vanadium comprises Ti-6Al-4V.

20. An additive manufacturing method comprising:
    forming an object containing Ti-6Al-4V by additive manufacturing, the object having a first microstructure containing columnar structures along a build direction of the additive manufacturing and the object exhibiting mechanical property anisotropy resulting from the columnar structures;
    after completing a shape of the object, hydrogenating the Ti-6Al-4V using hydrogen-containing gas;
    heat treating the object containing the hydrogenated titanium between about 600 and about 1,000° C.; and
    dehydrogenating the heat treated object under vacuum between about 500 and about 1,200° C. and reducing mechanical property anisotropy, the completed shape containing about 0.5 to about 1.2 weight % hydrogen before the dehydrogenating and the dehydrogenated object having a second microstructure exhibiting finer structure compared to the first microstructure such that the dehydrogenated object exhibits a size of alpha colonies, in the smallest dimension of the alpha colonies, of less than about 25 microns and an acicular alpha phase width, in the smallest dimension of the acicular alpha phase in the alpha colonies and in grain boundaries, of less than about 10 microns.

\* \* \* \* \*